(12) United States Patent
Young (10) Patent No.: US 10,861,104 B1
(45) Date of Patent: Dec. 8, 2020

(54) SYSTEM AND METHOD FOR CONFIGURING PAYMENT COUPON PROCESSING

(75) Inventor: Deborah A. Young, Los Angeles, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 279 days.

(21) Appl. No.: 13/620,460

(22) Filed: Sep. 14, 2012

Related U.S. Application Data (62) Division of application No. 12/505,953, filed on Jul. 20, 2009, now abandoned.

(60) Provisional application No. 61/082,461, filed on Jul. 21, 2008.

(51) Int. Cl.
*G06Q 20/14* (2012.01)
*G06Q 40/00* (2012.01)

(52) U.S. Cl.
CPC .................................. *G06Q 40/12* (2013.12)

(58) Field of Classification Search
CPC ........ G06Q 20/14; G06Q 20/00; G06Q 20/04; G06Q 20/02; G06K 9/033
USPC ................ 705/30, 35, 36 R, 14.13; 382/137; 235/379, 375
See application file for complete search history.

(56) References Cited

U.S. PATENT DOCUMENTS

| | | | |
|---|---|---|---|
| 5,220,501 A | | 6/1993 | Lawlor et al. |
| 5,537,314 A | * | 7/1996 | Kanter ........................ 705/14.13 |
| 5,677,955 A | | 10/1997 | Doggett et al. |
| 6,038,547 A | * | 3/2000 | Casto ...................... G06Q 10/06 705/30 |
| 6,059,185 A | | 5/2000 | Funk et al. |
| 6,202,054 B1 | | 3/2001 | Lawlor et al. |
| 6,286,756 B1 | * | 9/2001 | Stinson et al. ................ 235/379 |
| 6,400,845 B1 | * | 6/2002 | Volino ................. G06K 9/2054 358/462 |
| 6,429,952 B1 | | 8/2002 | Olbricht |
| 6,450,403 B1 | | 9/2002 | Martens et al. |
| 6,474,548 B1 | | 11/2002 | Montross et al. |
| 6,554,185 B1 | | 4/2003 | Montross et al. |
| 6,609,200 B2 | | 8/2003 | Anderson et al. |
| 6,650,767 B2 | | 11/2003 | Jones et al. |

(Continued)

FOREIGN PATENT DOCUMENTS

| | | |
|---|---|---|
| EP | 0 984 410 | 3/2000 |
| WO | WO-96/31965 | 10/1996 |

(Continued)

OTHER PUBLICATIONS

"Optical Character Recognition for Self-Service Banking," AT&T Technical Journal, Jul./Aug. 1995, pp. 16-24.

(Continued)

*Primary Examiner* — Vanel Frenel
(74) *Attorney, Agent, or Firm* — Foley & Lardner LLP (57) ABSTRACT

A computer-implemented system and method configure a payment processing system to interpret image data from scanned payment coupons. A screen display is generated for presentation to a recipient of payments, such as a business. The screen display shows a sample payment coupon. Configuration information is received that is generated based on user inputs. The user inputs designate a region of the sample payment coupon and define how scanned information in the designated region is to be interpreted.

11 Claims, 12 Drawing Sheets

(56) References Cited

U.S. PATENT DOCUMENTS

| | | |
|---|---|---|
| 6,754,640 B2 | 6/2004 | Bozeman |
| 6,913,200 B2 | 7/2005 | Sillman et al. |
| 7,181,430 B1 | 2/2007 | Buchanan et al. |
| 7,216,106 B1 | 5/2007 | Buchanan et al. |
| 7,349,566 B2 | 3/2008 | Jones et al. |
| 7,386,511 B2 | 6/2008 | Buchanan et al. |
| 7,391,987 B2 | 6/2008 | Sahara |
| 7,392,935 B2 | 7/2008 | Byrne et al. |
| 7,424,672 B2 | 9/2008 | Simske et al. |
| 7,440,924 B2 | 10/2008 | Buchanan et al. |
| 7,523,058 B2 * | 4/2009 | Gains et al. ............. 705/36 R |
| 7,526,117 B2 | 4/2009 | Foth et al. |
| 7,571,848 B2 * | 8/2009 | Cohen .................. G06Q 20/04 235/375 |
| 8,094,976 B2 | 1/2012 | Berard et al. |
| 8,627,939 B1 * | 1/2014 | Jones ..................... G07F 19/20 194/207 |
| 8,630,945 B1 * | 1/2014 | Sun ....................... G06Q 40/02 705/39 |
| 9,004,353 B1 * | 4/2015 | Block et al. ................ 235/379 |
| 2001/0018739 A1 | 8/2001 | Anderson et al. |
| 2001/0034720 A1 | 10/2001 | Armes |
| 2002/0001393 A1 | 1/2002 | Jones et al. |
| 2002/0004781 A1 | 1/2002 | Forsyth |
| 2002/0023055 A1 | 2/2002 | Antognini et al. |
| 2002/0038289 A1 | 3/2002 | Lawlor et al. |
| 2002/0046057 A1 | 4/2002 | Ross |
| 2002/0065786 A1 | 5/2002 | Martens et al. |
| 2002/0084321 A1 | 7/2002 | Martens et al. |
| 2002/0091635 A1 | 7/2002 | Dilip et al. |
| 2002/0133467 A1 | 9/2002 | Hobson et al. |
| 2002/0152164 A1 | 10/2002 | Dutta et al. |
| 2002/0152165 A1 | 10/2002 | Dutta et al. |
| 2002/0152166 A1 | 10/2002 | Dutta et al. |
| 2002/0152169 A1 | 10/2002 | Dutta et al. |
| 2002/0152170 A1 | 10/2002 | Dutta et al. |
| 2003/0023531 A1 | 1/2003 | Fergusson |
| 2003/0089768 A1 | 5/2003 | Page |
| 2003/0097331 A1 | 5/2003 | Cohen |
| 2003/0202690 A1 | 10/2003 | Jones et al. |
| 2003/0212904 A1 | 11/2003 | Randle et al. |
| 2003/0217005 A1 | 11/2003 | Drummond et al. |
| 2003/0223557 A1 | 12/2003 | Tal |
| 2004/0016796 A1 | 1/2004 | Hanna et al. |
| 2004/0044606 A1 | 3/2004 | Buttridge et al. |
| 2004/0049738 A1 | 3/2004 | Thompson et al. |
| 2004/0111371 A1 | 6/2004 | Friedman |
| 2004/0128896 A1 | 7/2004 | Baldwin |
| 2004/0133516 A1 | 7/2004 | Buchanan et al. |
| 2004/0138991 A1 | 7/2004 | Song et al. |
| 2004/0158532 A1 | 8/2004 | Breck et al. |
| 2004/0199422 A1 | 10/2004 | Napier et al. |
| 2005/0040225 A1 * | 2/2005 | Csulits et al. ................ 235/379 |
| 2005/0076295 A1 | 4/2005 | Simske et al. |
| 2005/0108168 A1 * | 5/2005 | Halpin ................. G06Q 20/042 705/45 |
| 2005/0163362 A1 * | 7/2005 | Jones .................... G06K 9/033 382/137 |
| 2006/0242063 A1 | 10/2006 | Peterson et al. |
| 2006/0249567 A1 | 11/2006 | Byrne et al. |
| 2007/0118449 A1 * | 5/2007 | De La Motte ......... G06Q 40/00 705/35 |
| 2008/0040249 A1 * | 2/2008 | Re .......................... G06Q 40/00 705/35 |
| 2008/0249936 A1 * | 10/2008 | Miller .................. G06Q 20/102 705/40 |
| 2009/0094100 A1 * | 4/2009 | Xavier ................... G06Q 20/20 705/16 |
| 2009/0150211 A1 * | 6/2009 | Bayne ................... G06Q 30/00 705/14.17 |
| 2009/0150271 A1 * | 6/2009 | Bishop et al. .................. 705/30 |
| 2009/0288012 A1 * | 11/2009 | Hertel .................... G06Q 20/02 715/738 |
| 2009/0310188 A1 * | 12/2009 | Jones .................. G06Q 20/042 358/448 |
| 2009/0319402 A1 | 12/2009 | Manista et al. |
| 2010/0030671 A1 * | 2/2010 | Gelerman ........... G06F 21/6218 705/30 |
| 2010/0157379 A1 * | 6/2010 | Simonoff ..................... 358/3.28 |
| 2010/0161466 A1 * | 6/2010 | Gilder ................... G06Q 20/04 705/34 |
| 2011/0313918 A1 * | 12/2011 | Lawson ............... G06Q 20/102 705/40 |
| 2014/0114851 A1 * | 4/2014 | Lawson ............... G06Q 20/102 705/41 |
| 2015/0170241 A1 * | 6/2015 | Jacobsen ................. H04L 63/12 705/26.41 |

FOREIGN PATENT DOCUMENTS

| | | |
|---|---|---|
| WO | WO-98/26364 | 6/1998 |
| WO | WO-98/37655 | 8/1998 |
| WO | WO-00/55793 | 9/2000 |
| WO | WO-00/57330 | 9/2000 |
| WO | WO-01/61436 | 8/2001 |
| WO | WO-01/61569 | 8/2001 |
| WO | WO-01/80145 | 10/2001 |
| WO | WO-01/84453 | 11/2001 |
| WO | WO-02/075478 | 9/2002 |

OTHER PUBLICATIONS

A Browser-Based Solution that Leads the Way to the Future of Imaging, http://www.brasfieldtech.com/checkimaging.php, © 2004 Image Centre, LLC, 2 pgs.

Check 21, http://wqad.com/Global/story.asp?S=2420912&nav=1sWARuwM, © Copyright 2001-2004 WorldNow and WQAD, 2 pgs.

Check Imaging, A Browser-Based Solution that Leads the Way to the Future of Imaging, http://www.brasfieldtech.com, © 2004 Image Centre, LLC, 2 pgs.

DIALOG (R) File 2: INSPEC (c) 2004 Institution of Electrical Engineers, Wang et al., "A Fault Tolerant Chinese Bank Check Recognition System," (abstract only), 1997 IEEE Intl. Conf. on Intelligent Processing Systems, IEEE, New York, NY, Oct. 1997, Beijing, China, 2 pgs.

DIALOG (R) File 2: INSPEC (c) 2004 Institution of Electrical Engineers, Yao, et al., "Document Scanning with a New Family of Experimental High-Performance TDI-CCD Imaging Devices", (abstract only), Electronic Imaging '88, Intl. Electronic Imaging Expo. and Conf., Mar. 1988, Anaheim, CA, 2 pgs.

Final Office Action on U.S. Appl. No. 12/505,953, dated Aug. 17, 2012, 16 pgs.

Maverick Check Scanning Solutions, http://pbsoffice.com/micro_replacement.htm., Copyright © 2000-2003 Progressive Business Systems, Inc., 7 pgs.

Non-Final Office Action on U.S. Appl. No. 12/505,953, dated Mar. 7, 2012, 15 pgs.

Products, Digital Check, http://www.digitalcheck.com/I1_products.html, © 2004 Digital Check Corporation, 2 pgs.

Remote Deposit, http://www.bankserv.com/products/remotedeposit.htm, cited in parent application on Nov. 4, 2009, 3 pgs.

Non-Final Office Action on U.S. Appl. No. 12/505,953, dated Oct. 18, 2013, 15 pages.

* cited by examiner

Desktop Deposit

Coupon Setup Details – Water Bill

✦ Utility Billing

| ACCOUNT NUMBER | BILLING DATE | DUE DATE |
|---|---|---|
| 032809-02 | 4/28/2007 | 5/8/2007 |

58 E 101ST AVE
THORTON CO 80229-3556

TOTAL BALANCE DUE  $ 22.45
PLEASE INDICATE AMOUNT OF REMITTANCE  $

ROUTE  18   CYCLE 1
58 E 101ST AVE 32809022 0022459 2

Customer Number: 32809022
Customer Name: 00022459
Invoice Number: 2

X Close
🖶 Print 1100
1110
1112

FIG. 11

SYSTEM AND METHOD FOR CONFIGURING PAYMENT COUPON PROCESSING

CROSS-REFERENCE TO RELATED APPLICATIONS

This application is a divisional of co-pending U.S. application Ser. No. 12/505,953, entitled "System and Method for Configuring Payment Coupon Processing," filed on Jul. 20, 2009, which claims the benefit of 61/082,461, entitled "System and Method for Configuring Payment Coupon Processing," filed Jul. 21, 2008, the entirety of which are hereby expressly incorporated by reference herein.

BACKGROUND

Businesses often receive payment for goods and services in the form of checks. For example, a business may send its customers a bill such as an invoice itemizing the goods or services that were provided or will be provided. The bill may be accompanied by a payment coupon which, for example, may be attached by perforation or sent separately. As another example, the customer may be provided with a book of payment coupons which is used to make payments on a periodic (e.g., monthly) basis. The payment coupon may include various identification information (e.g., a customer name, a customer account number, etc.), payment information (e.g., the amount owed, the amount to be paid, etc.), and/or other information. The customer then remits payment for the goods or services by sending the payment coupon and a check to the business.

Often, upon receiving the check and the payment coupon, the business may electronically deposit the check with a bank. For example, the Check Clearing for the 21st Century Act, commonly known as Check 21, allows banks to create and present a substitute check or image replacement document (IRD) for payment in place of the original check. With the implementation of Check 21, a business may scan checks it receives and deposit the checks in its bank by sending the bank the IRD. In some instances, the payment coupon may also be scanned and sent to the bank to facilitate processing of the check. This accelerates settlement and eliminates inefficiencies associated with physically transporting checks.

While above-described improvements have made the process of depositing checks more timely and efficient, further enhancements are needed.

SUMMARY

One embodiment of the invention relates to a computer-implemented system and method configure a payment processing system to interpret image data from scanned payment coupons. A screen display is generated for presentation to a recipient of payments, such as a business. The screen display shows a sample payment coupon. Configuration information is received that is generated based on user inputs. The user inputs designate a region of the sample payment coupon and define how scanned information in the designated region is to be interpreted.

DETAILED DESCRIPTION OF THE EXAMPLE EMBODIMENTS

Figure 1A:
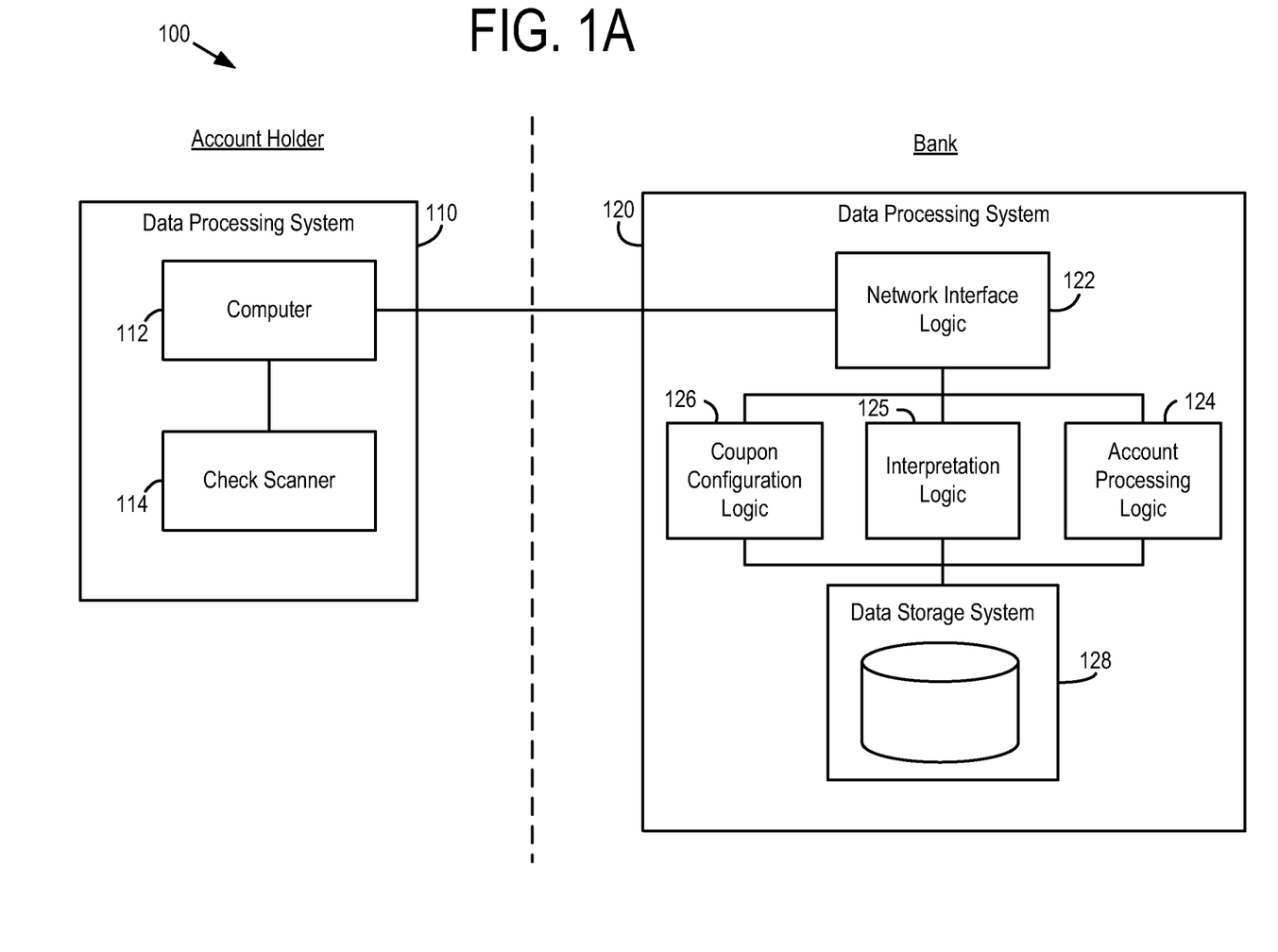
FIG. 1A is a schematic diagram of a data processing system according to an example embodiment.

Referring to FIG. 1, a payment processing system 100 is shown. Payment processing system 100 may be used by a bank to receive electronic check deposits from account holders with the bank. The account holders may, for example, be businesses that receive payments from customers in the form of checks and accompanying payment coupons. The payments may be for goods and/or services, for example. The business may be the payee on the check and deposits the check in its account with the bank.

The payment processing system 100 comprises a data processing system 110 associated with the account holder and a data processing system 120 associated with the bank. The data processing system 110 of the account holder includes a computer 112 and a check scanner 114. The check scanner 114 may be used by the account holder to scan checks and payment coupons received from customers. In an example embodiment, the scanner is optimized for check scanning, for example, by being capable of extracting magnetic ink character recognition (MICR) data and/or other data from checks. Other scanners, such as flatbed scanners, may also be used. The scanner 114 scans the endorsed check to generate an image replacement document, i.e., a digitized version of the check. The scanner 114 also scans the payment coupon to generate a digitized version of the payment coupon. The digitized versions of the check and payment coupon are virtually partitioned into a plurality of regions, e.g., stripes or zones. Each region may be successively examined to extract information from that region.

In the example of FIG. 1, the account holder is assumed to be a business that receives payments from its customers. However, other arrangements are also possible. For example, the entity that directly receives payments may be a vendor that receives payments on behalf of the business from the customers of the business, and the business may receive the payments indirectly via the vendor. Herein, the term "recipient of payments" encompasses any entity that receives payments, directly or indirectly, other than the bank with whom the payments are deposited.

The data processing system 120 associated with the bank comprises network interface logic 122, account processing logic 124, interpretation logic 125, coupon configuration logic 126, and a data storage system 128. The data processing system 120 may comprise a computer system (e.g., one or more servers each with one or more processors executing program instructions stored in memory) configured to implement the operations described herein associated with logic 122-128. The network interface logic 122 is configured to cooperate with logic 124-126 and/or other logic to generate a user interface through which the account holder may access the data processing system 120. For example, the network interface logic 122 may include a web server that generates web pages provided to the account holder through the Internet. For example, web pages may be provided that make on-line banking tools available to the account holder. Additionally, web pages may be provided that may be used by the user to cause the data processing system 120 to provide the user with information regarding pending deposits, to create new deposits, to generate reports, and to configure the data processing system 120 to be able to process individual payment coupons that are laid out in a particular (e.g., user-customized) manner. Examples of such web pages are described in greater detail below in connection with FIGS. 2-11.

The account processing logic 124 performs account processing in connection with the account of the account holder, such as settlement and posting. The account processing logic 124 may be configured to credit the check deposit to an account of the recipient of payments in accordance with interpreted image data from the check and the payment coupon. The interpreted image data may be provided by the interpretation logic 125, which may be configured to access configuration information in the data storage system 128 to interpret image data from the payment coupon. Account information is stored in the data storage system 128. The digital version of the check and/or payment coupon may also be stored in the data storage system 128, e.g., in a check image repository.

The coupon configuration logic 126 provides an on-line coupon setup tool which obtains the configuration information that is used by the interpretation logic 125 to interpret payment coupons. During a setup process, described in greater detail below, the coupon interpretation logic 126 prompts a recipient of payments to provide user inputs to generate the configuration information. The user inputs designate regions of the sample payment coupon and define how scanned information in the designated regions is to be interpreted. Once the configuration information is obtained, the coupon configuration logic 126 is configured to store the configuration information in the data storage system 128. The configuration information is for individual payment coupons used by individual account holders when receiving payments in the course of their business. Thus, the coupon setup tool may be made available via the Internet to different account holders, each of whom is then able to configure the system 100 for use with their payment coupons. In the illustrated embodiment, the interpretation logic 125 and the coupon configuration logic 126 reside at the data processing system 120 of the bank. In other embodiments, one or both of the interpretation logic 125 and the coupon configuration logic 126 may reside at the data processing system 110 of the account holder.

Figure 1B:
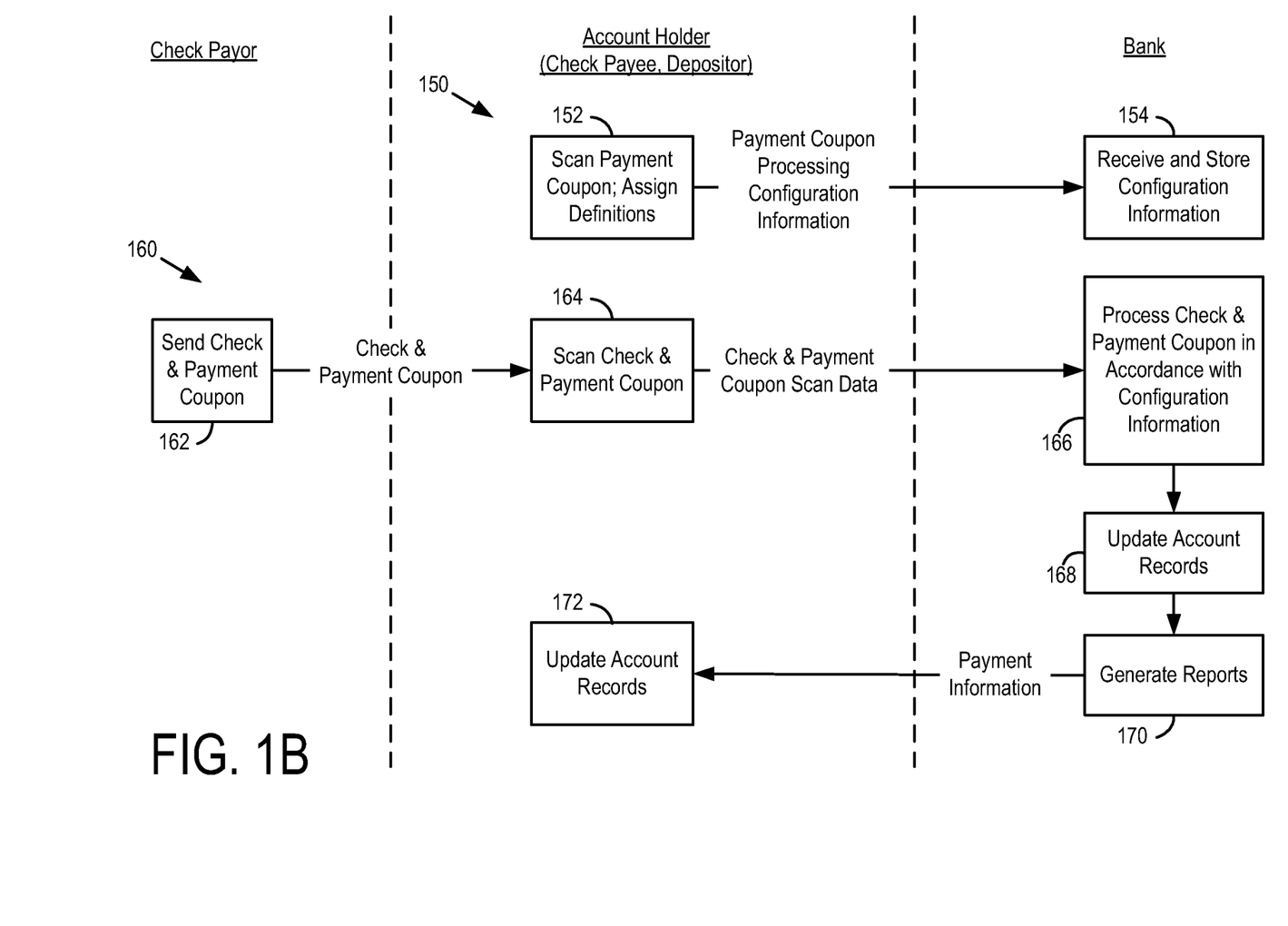
FIG. 1B is a process implemented by the data processing of FIG. 1A.

Referring now to FIG. 1B, FIG. 1B shows an overview of processes 150 and 160 implemented by the data processing system 100 of FIG. 1A. In process 150, the payment processing system 100 is configured responsive to user inputs to interpret image data from a scanned payment coupon. In process 160, a check deposit from a recipient of payments is processed.

Referring first to process 150, at step 152, the user is prompted to scan the payment coupon and to assign definitions to various fields on the payment coupon. After the coupon is scanned by the scanner 114, a screen display is generated for presentation to the user which shows the sample payment coupon. After being prompted to do so, the user provides user inputs (e.g., mouse movements, mouse clicks, keyboard taps, etc.) designating a region of the sample payment coupon and defining how scanned information in the designated region is to be interpreted. Based on such user inputs, configuration information (e.g., storable representations of the user inputs) is generated for use in later processing of similar payment coupons by the data processing system 100. The configuration information may also be processed before or after being provided to the data processing system 120, for example, to change data format or for other reasons. After being received at the data processing system 120, the configuration information is stored in the data storage system 128. The configuration information may be stored along with configuration information received from other users associated with other recipients of payments. Process 150 is described in greater detail below in connection with FIGS. 2-11.

With regard to process 160, at step 162, the customer sends a check and payment coupon to the business or other recipient of payments. At step 164, the check and payment coupon are scanned by the scanner 114 and image data for the check and the payment coupon is received by the computer 112. At step 166, the stored configuration information indicating the manner in which scan fields in the payment coupon are to be interpreted is accessed. The image data from the payment coupon is then interpreted based on the configuration information. At step 168, account records are updated, for example, the check deposit may be credited to an account of the business in accordance with the interpreted image data. The account processing logic 124 may also be configured to maintain account information relating to customers of the business. For example, based on the information in the payment coupon, the account processing logic 124 may be configured to track payments made by customers of the business. Reports may then be generated at step 170 which provide details regarding payments received from customers, for example, the date payments were received, the payment amounts, and so on. This information may then be used by the business at step 172 to update its own account records.

Referring now to FIGS. 2-11, various screen displays are shown that may be generated during the process 150. In an example embodiment, the coupon configuration logic 126 provides an on-line tool that is accessible to businesses via the Internet. In such an embodiment, the screens may be web pages displayed within a web browser, and the configuration information may be received from the user (e.g., a business acting through a human operator) by way of the Internet.

Figure 2:
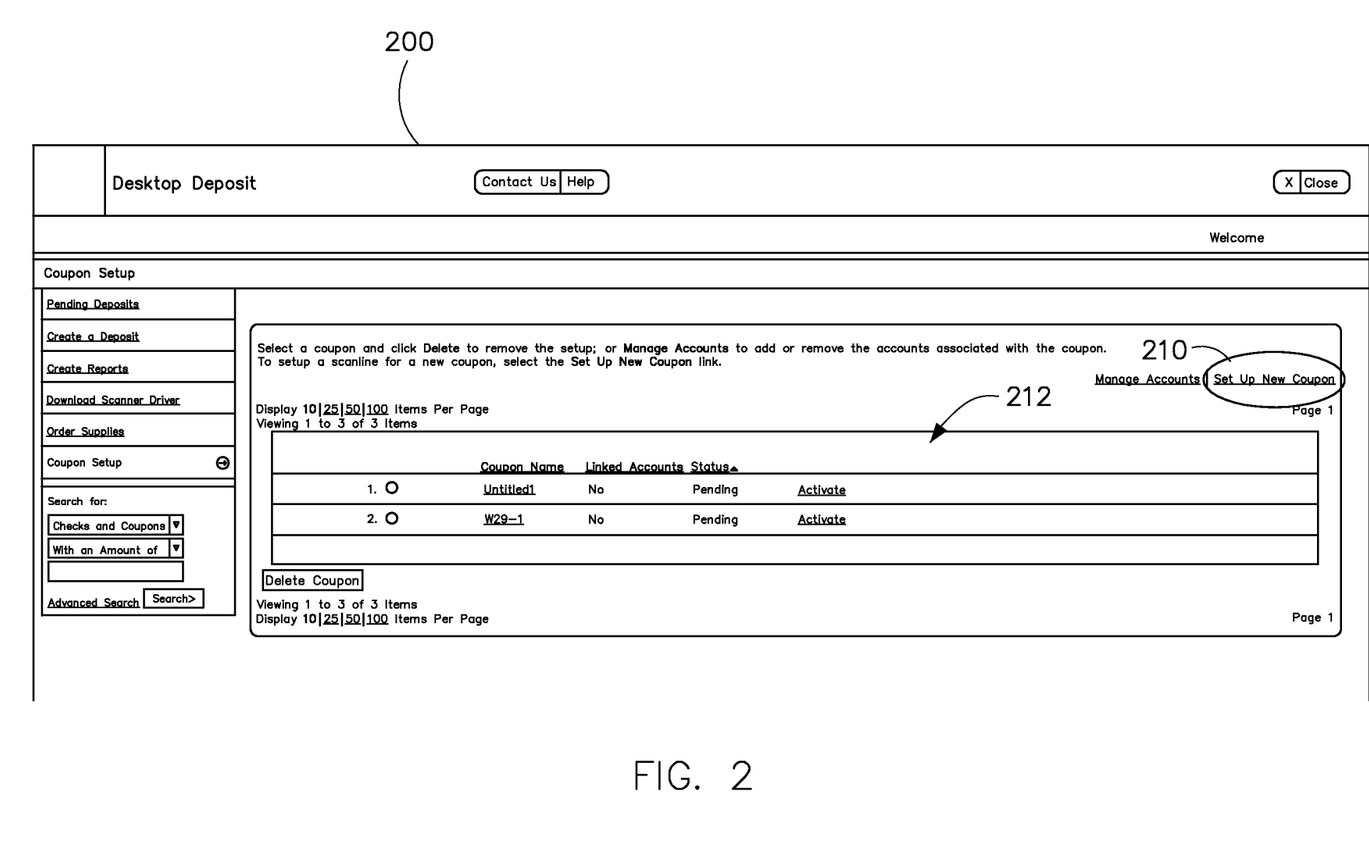
FIG. 2 is a screen shot showing a screen that may be provided to a user to prompt the user to set up a new payment coupon, according to an example embodiment.

Referring now to FIG. 2, FIG. 2 shows an initial screen 200 that may be provided to the user to prompt the user to set up a new payment coupon. In FIG. 2, the user selects a button 210 to set up the new payment coupon. Also shown in a region 212 are links for existing payment coupons that have already been configured. For example, a business may configure the data processing system 100 for use with multiple different payment coupons and have a separate account with the bank associated with each payment coupon.

Figure 3:
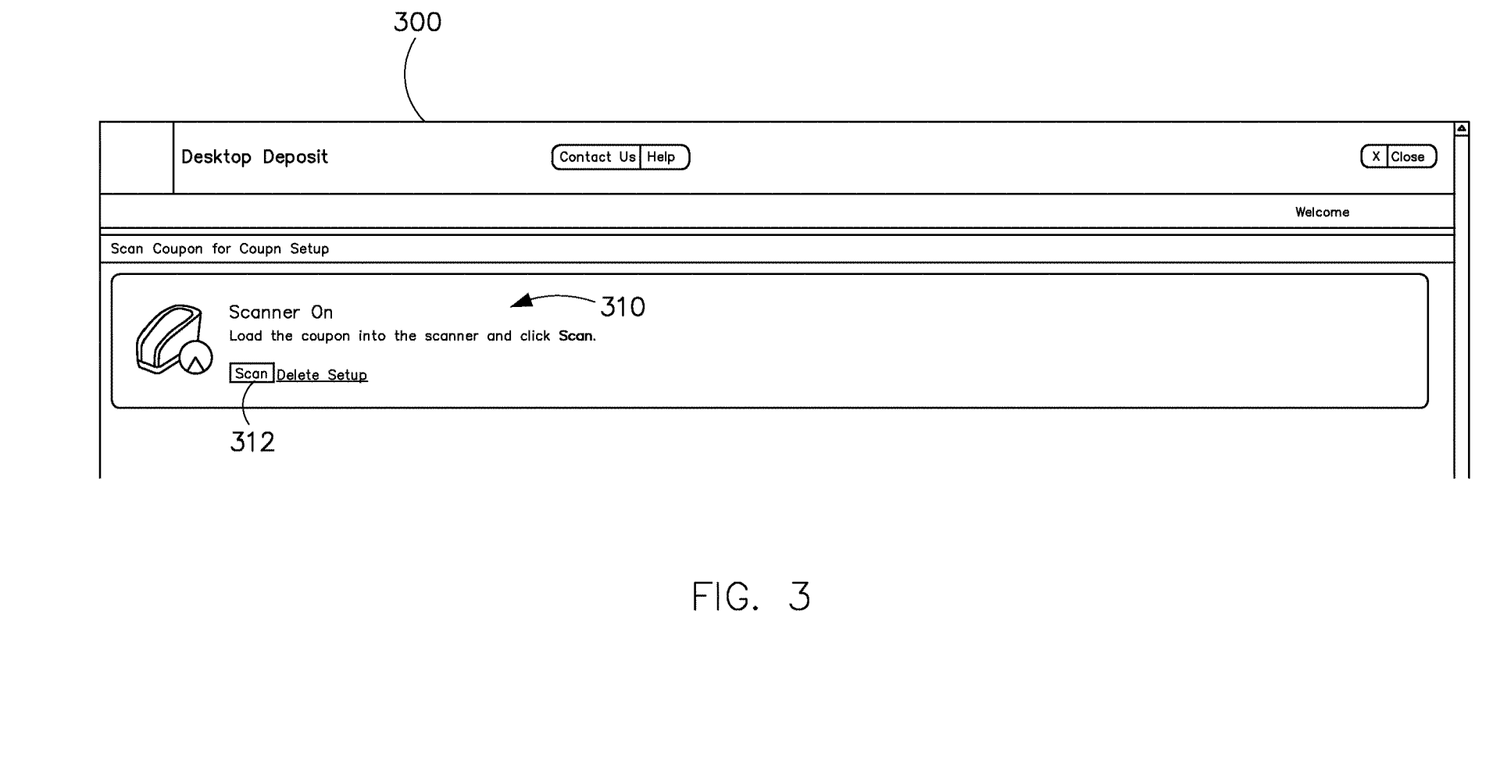
FIG. 3 is a screen shot showing a screen that may be provided to a user to prompt the user to prompt the user to scan the payment coupon, according to an example embodiment.

Referring now to FIG. 3, FIG. 3 shows a screen 300 that is provided to the user to prompt the user to scan the payment coupon. In field 310, the user is provided with instructions to load the coupon into the scanner. After the user loads a coupon into the scanner and selects button 312, the payment coupon is scanned.

Figure 4:
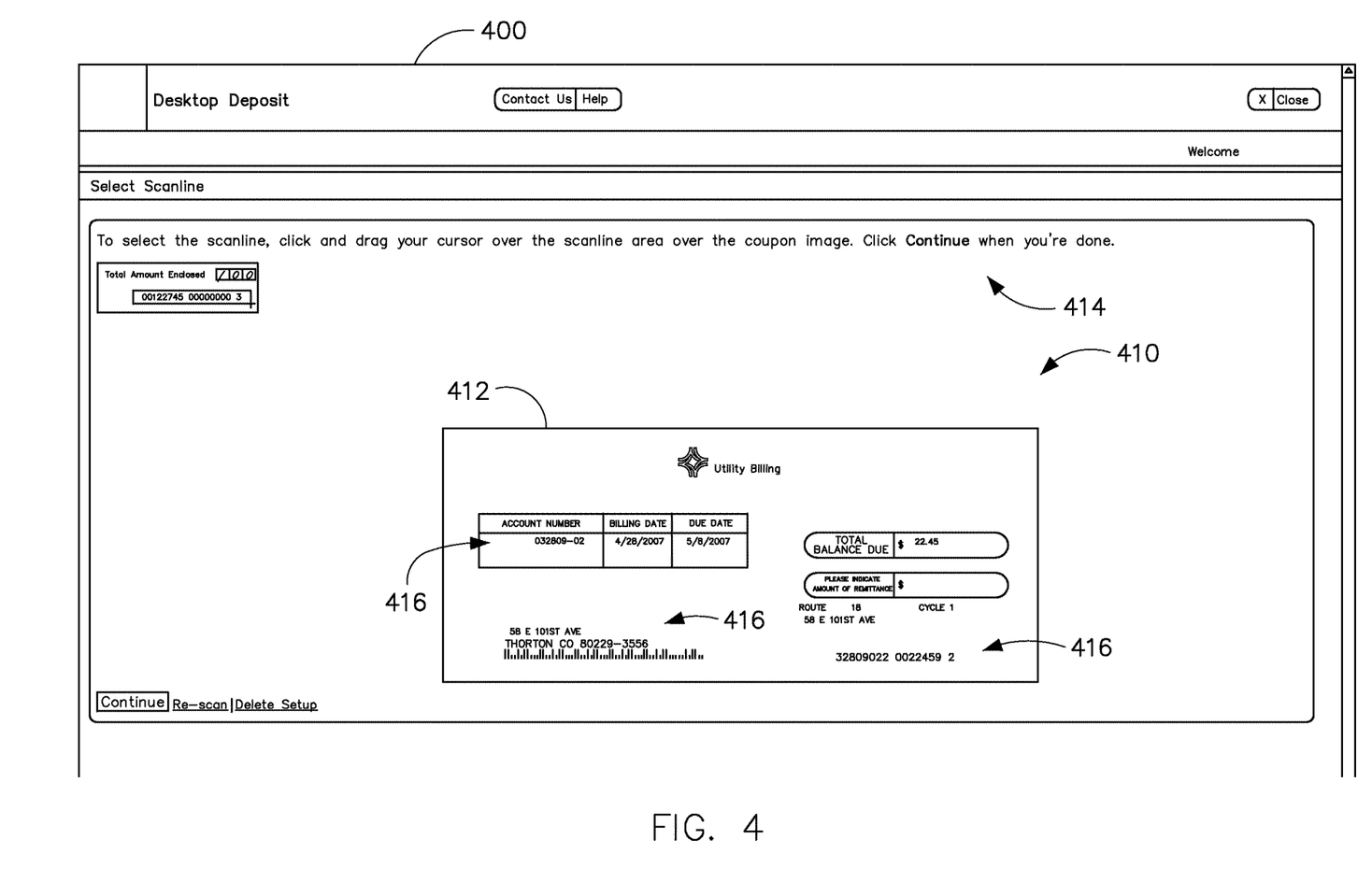
FIG. 4 is a screen shot showing a screen that may be provided to a user after a payment coupon has been scanned, according to an example embodiment.

Referring now to FIG. 4, FIG. 4 shows a screen 400 that is provided to the user after the payment coupon has been scanned. In FIG. 4, in field 410, the user is presented with an image 412 of the scanned payment coupon. In field 414, the user is prompted to provide the user inputs designating the region of the sample payment coupon (e.g., through dragging and clicking of a mouse). For example, the user may be prompted to place a text box around one of various scanlines 416 containing relevant information.

Figure 5:
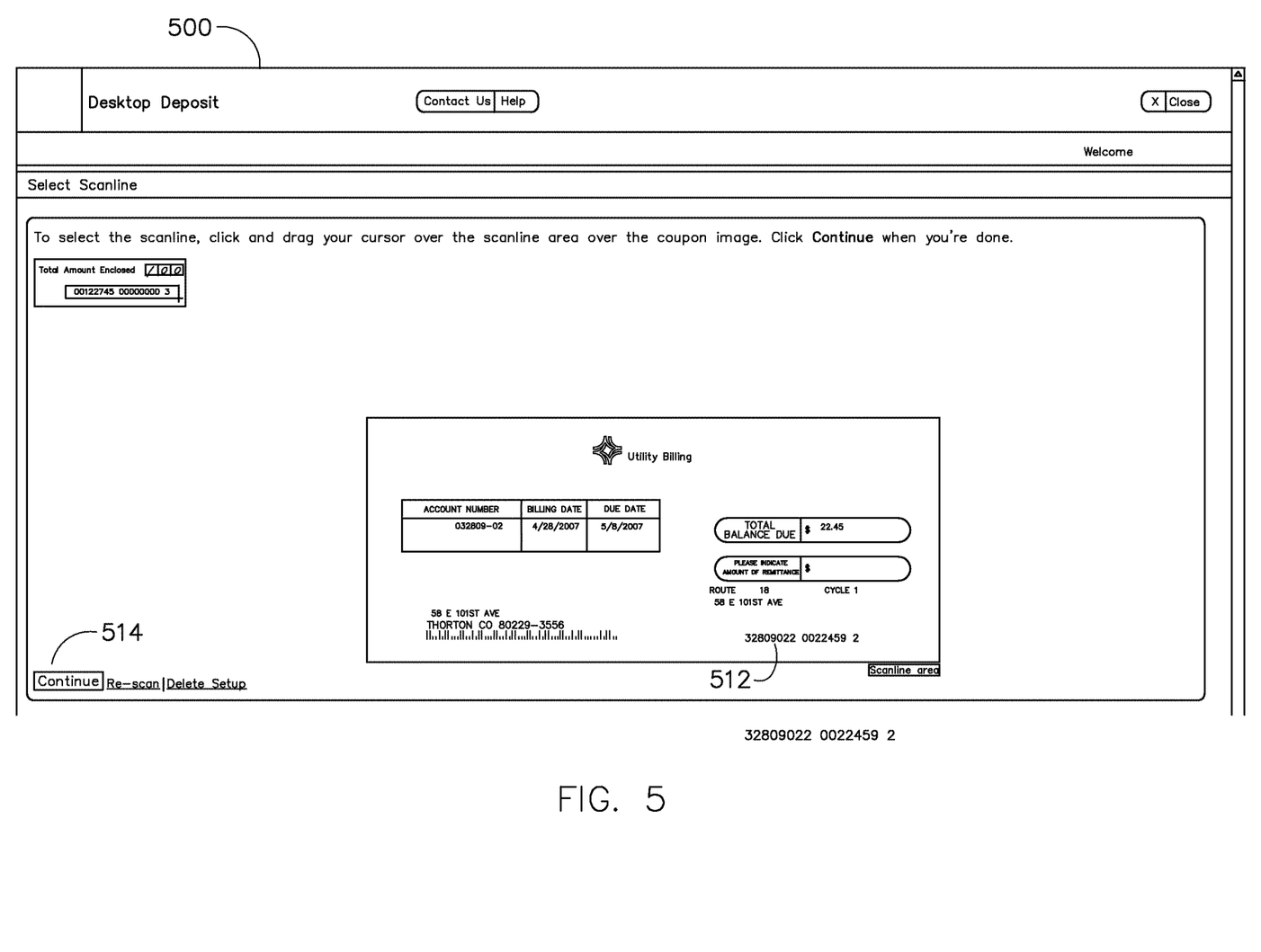
FIG. 5 is a screen shot showing a screen in which a user has designated a scanline to be interpreted, according to an example embodiment.

Referring now to FIG. 5, FIG. 5 shows a screen 500 that is similar to the screen 400 of FIG. 4. In FIG. 5, the user has placed a box 512 around one of the scanlines 416 of FIG. 4. If a mistake is made, the user may be given the ability to drag and drop a new text box around the coupon scanline and re-do the text box as many times as needed. Once the text box is appropriately placed, the user selects a continue button 514.

Figure 6:
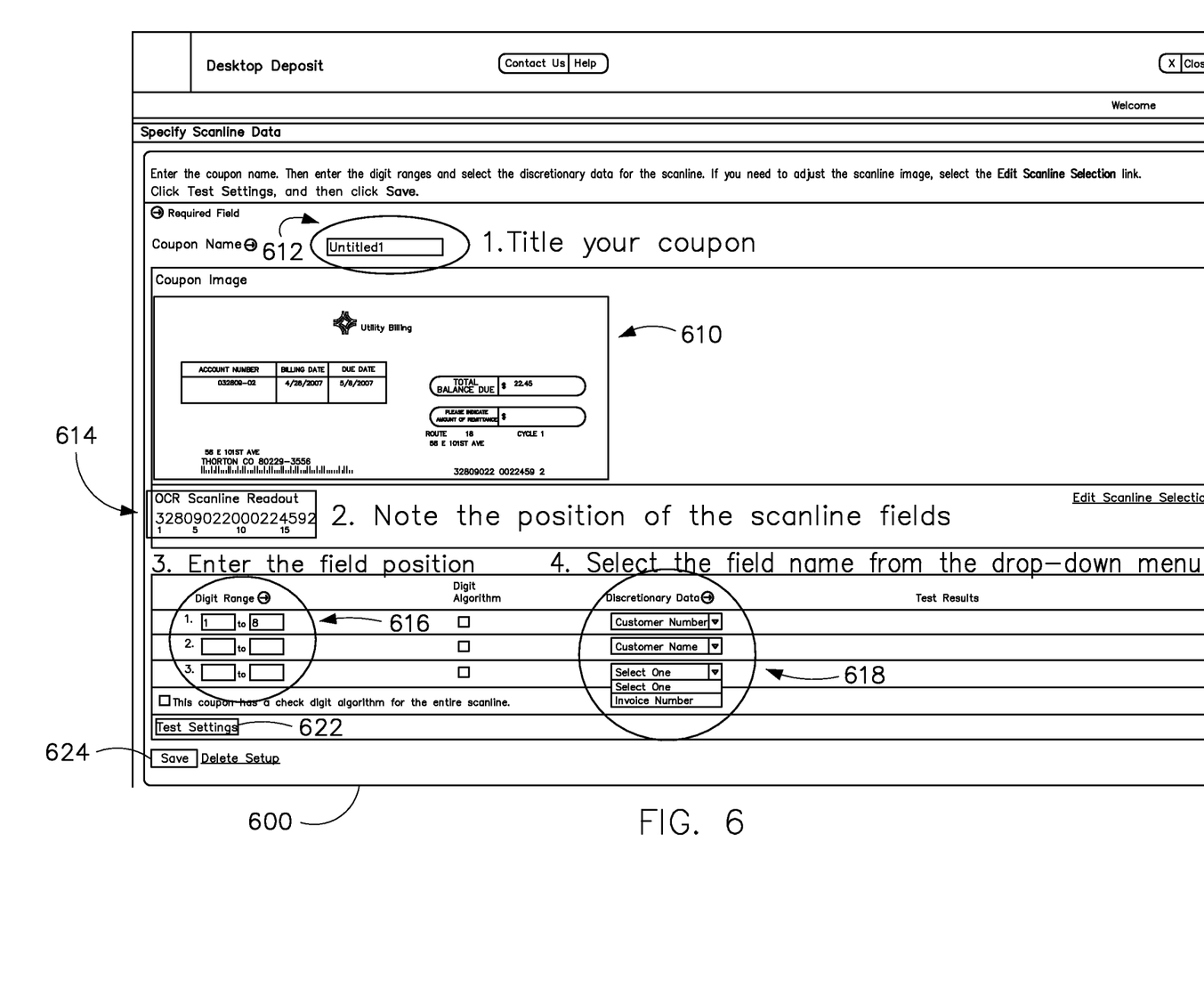
FIG. 6 is a screen shot showing a screen in which a user is prompted to specify scanline data to interpret the scanline, according to an example embodiment.

Referring now to FIG. 6, FIG. 6 shows a screen 600 in which a user is prompted to define how scanned information in the designated region(s) is to be interpreted. In field 610, the user is provided with an image of the payment coupon. In field 612, the user is prompted to provided a name for the payment coupon. In field 614, the user is provided with a depiction of the OCR scanline readout. In fields 616 and 618, the user is prompted to assign definitions to the scanline readout. In the example of FIG. 6, the scanline comprises seventeen digits. In field 616, the user is prompted to specify a subset of digits in the scanline and, in field 618, the user is prompted to define the interpretation for the specified digits. For example, in FIG. 6, in the first row of fields 616 and 618, the user has provided inputs which define the first eight digits of field 614 as corresponding to a customer number. Likewise, additional definitions regarding portions of the scanline may be received through the second and third rows of fields 616 and 618. The configuration information may be used to configure processing of customer numbers, customer names, invoice numbers, and/or other scanned information. Field 620 may be used to prompt whether a field uses a modulus-10 check digit algorithm. The user is prompted to select a button 622 to test the definitions or a button 624 to save the definitions.

Figure 7:
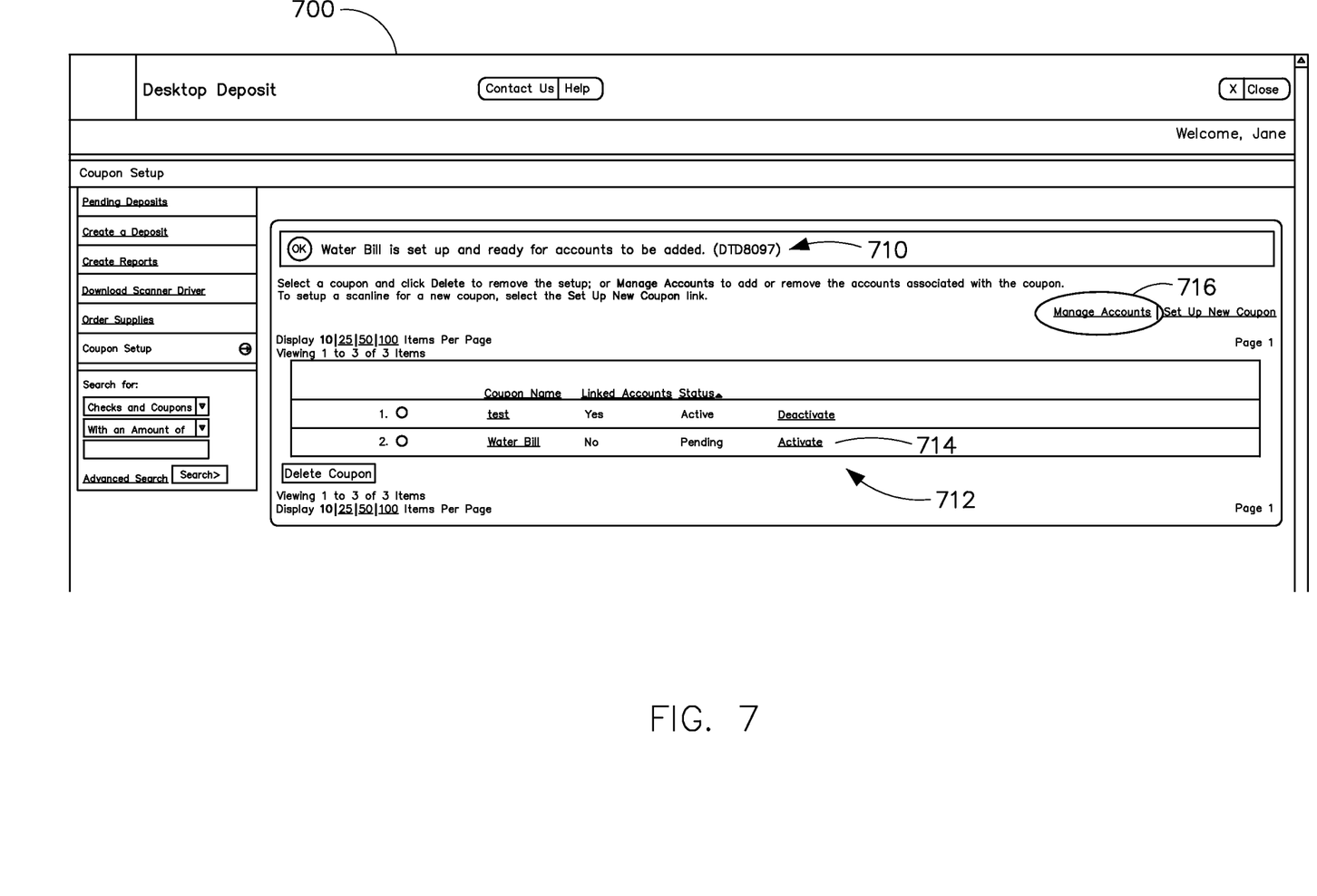
FIG. 7 is a screen shot showing a screen in which the user is presented with a list of payment coupons that have been configured, according to an example embodiment.

Referring now to FIG. 7, FIG. 7 shows a screen 700 which may be provided responsive to the user selecting the save button 624 in FIG. 6. In FIG. 7, in region 712, a message is provided that the "water bill" payment coupon has just been set up and is ready for accounts to be added. In region 714, the "water bill" payment coupon is indicated as pending with no accounts, and a button 714 is provided for the user to activate the payment coupon. Button 716 may be selected to manage accounts associated with a selected payment coupon.

Figure 8:
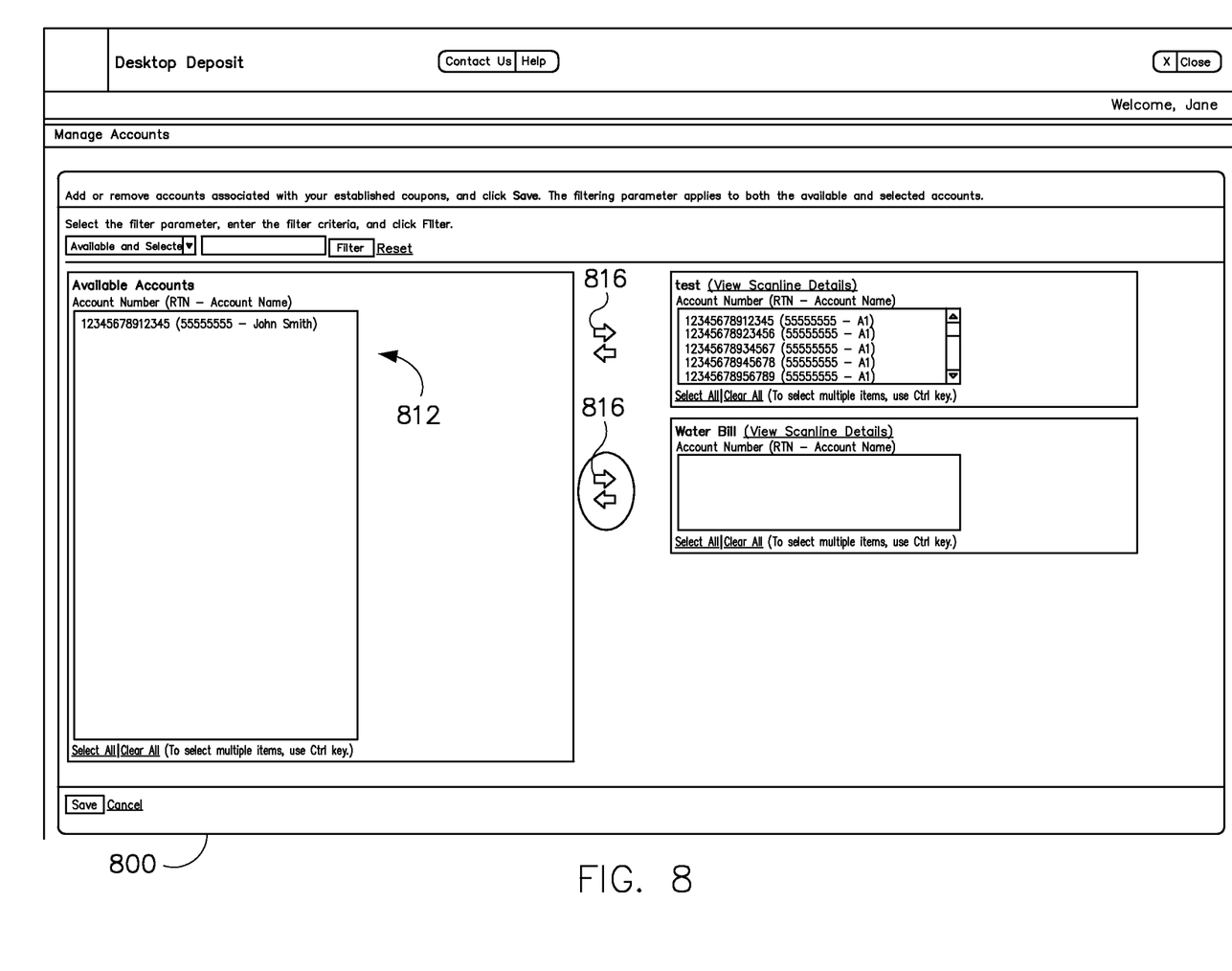
FIGS. 8-9 are screen shots showing screens that may be provided responsive to the user selecting a button to manage accounts in FIG. 7, according to an example embodiment.
Figure 9:
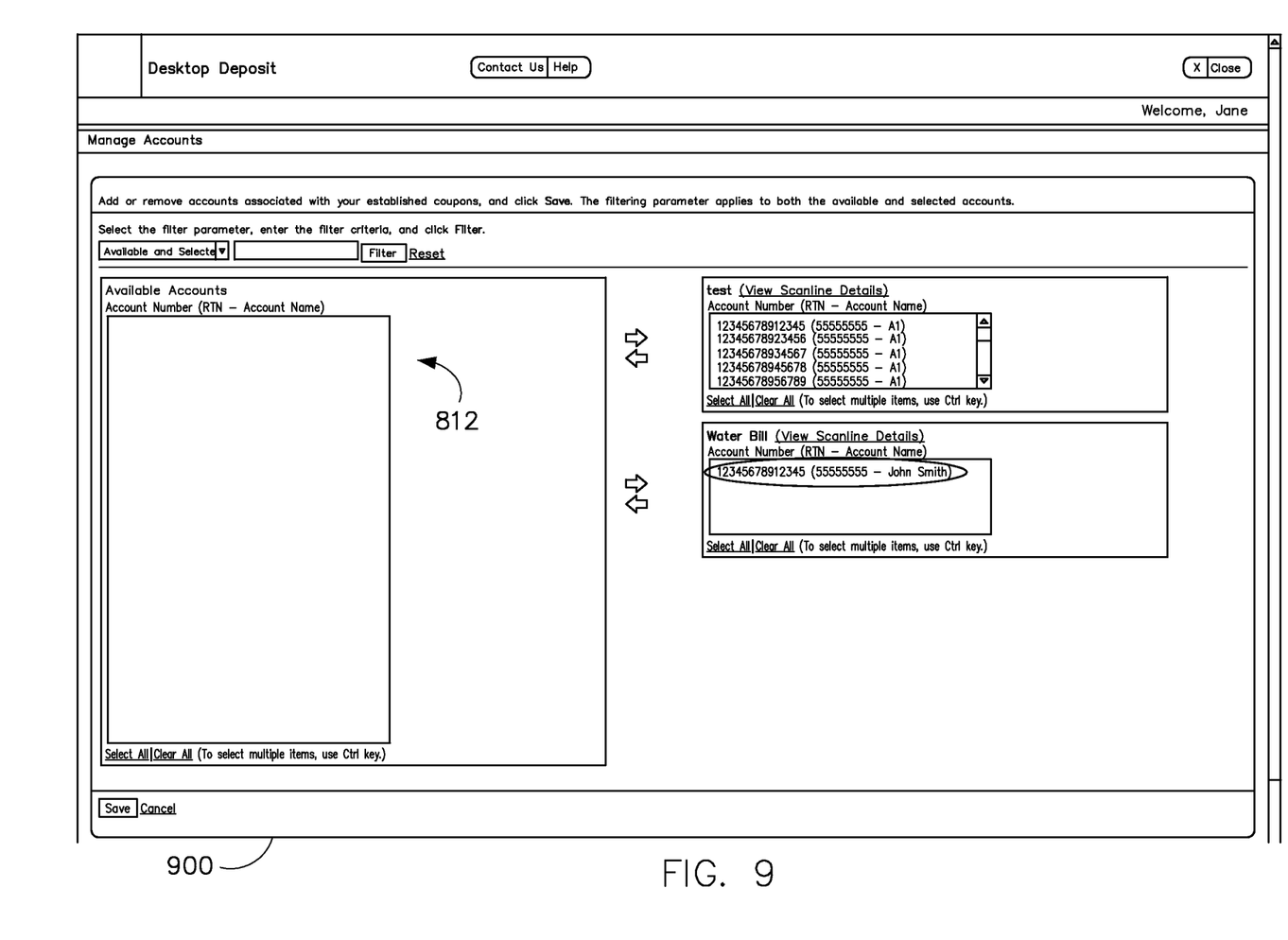
Figure 10:
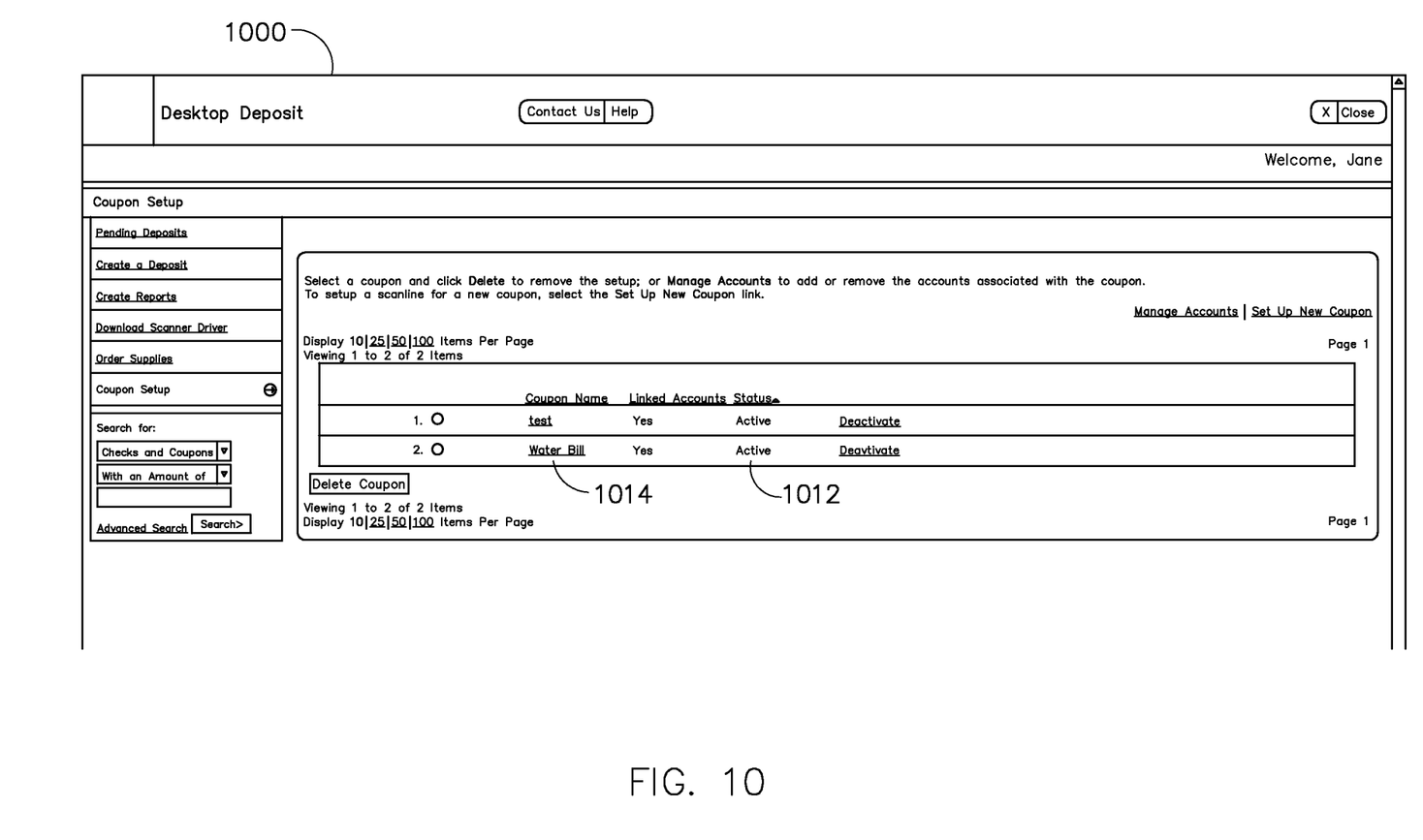
FIG. 10 is a screen shot similar to the screen shot of FIG. 7 in which a payment coupon is designated as being active, according to an example embodiment.

Referring now to FIG. 8, FIG. 8 shows a screen 800 that is presented responsive to the user selecting the button 716 to manage accounts in FIG. 7. The user is prompted to assign available accounts in field 812 to the payment coupon using arrows 816. The user may select from either or both of the two payment coupons shown in FIG. 7. In FIG. 8, the user is configuring both payment coupons ("test" and "water bill") shown in FIG. 7. The user is prompted to associate a deposit account with a payment coupon, so that checks received with the payment coupon are deposited to the account. Thus, when the user receives a check that is accompanied by the "water bill" payment coupon, the user may scan the check and the payment coupon using the check scanner 114, and the data processing system 120 may electronically deposit the check in the deposit account. In an example embodiment, multiple customer accounts may be assigned to a single coupon template. Thus, the user may also associate multiple customer accounts with a coupon template. FIG. 9 is similar to FIG. 8 except that an available account in FIG. 8 has been assigned to the "water bill" payment coupon in FIG. 9. In FIG. 10, the user has clicked on the activate button and the payment coupon is indicated as being active in field 1012. The user is provided with the option of viewing the coupon template by clicking on link 1014.

Figure 11:
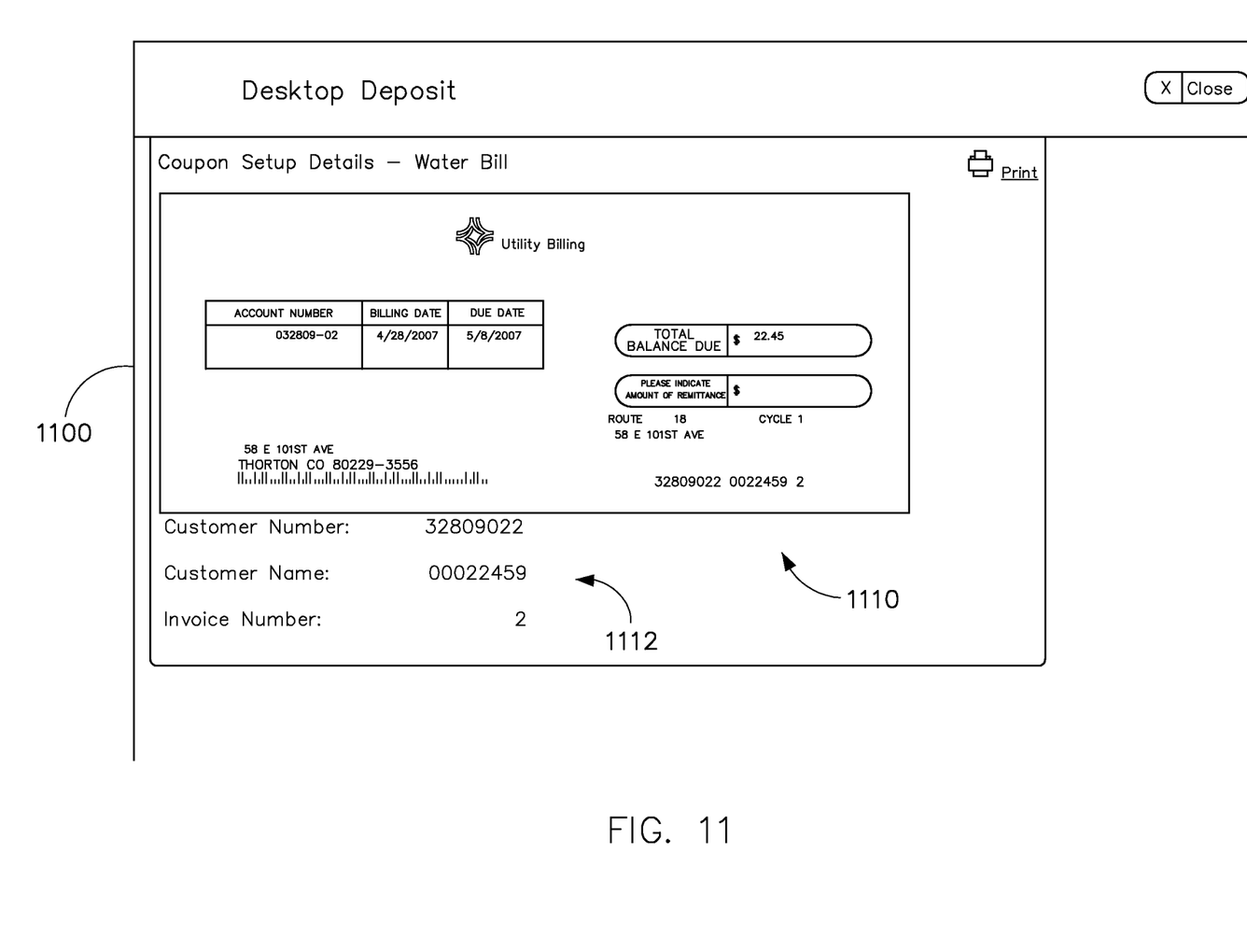
FIG. 11 is a screen shot showing a screen that may be provided to a user to confirm coupon set-up, according to an example embodiment.

Referring now to FIG. 11, FIG. 11 shows a screen 1100 that is presented responsive to the user selecting the link 1014 to view the coupon template in FIG. 10. In FIG. 11, the screen 1100 includes a first display region 1110 and a second display region 1112. The first display region 1110 displays an image of the sample payment coupon. The second display region 1112 displays how scanned information displayed in the first display region is to be interpreted. The user is thus provided with confirmation of the set-up. After electronic check deposits are received by the data processing system 120, the data processing system may use the customer number, customer name, and invoice number information to generate reports for the user showing funds that the user has received from its customers. For example, reports may be generated identifying specific customers, funds that have been received from such customers, and the invoices for which the funds were received.

The embodiments of the present invention have been described with reference to drawings. The drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present invention may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing computers in the form of computers, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. Input devices, as described herein, include a keyboard, a keypad, a mouse, joystick or other input devices performing a similar function. The output devices, as described herein, include a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present invention as defined in the appended claims. Such variations will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the design, operating conditions and arrangement of the embodiments without departing from the scope of the present invention as expressed in the appended claims.

What is claimed is:

1. A data processing computer system for processing a check deposit from a recipient of payments, comprising:
   a processor and non-transitory machine-readable media having instructions stored therein that, when executed by the processor, cause the system to implement a process that includes:
   receiving, by network interface logic of the data processing computer system, image data for a check;
   receiving, by the network interface logic of the data processing computer system, image data for a payment coupon associated with the check,
      wherein the payment coupon is associated with a periodic payment made to the recipient of payments, and
      wherein the image data for the payment coupon includes information related to the periodic payment;
   accessing, by coupon configuration logic of the data processing computer system, stored configuration information indicating a manner in which scan fields in the payment coupon are to be interpreted, the coupon configuration logic configured to provide a first screen display to be displayed to the recipient of payments within a web browser, the configuration information being received from the recipient of payments by way of the Internet, the configuration information comprising definitions of how scanned information in designated regions is to be interpreted, and wherein the coupon configuration logic is further configured to:
      provide a second screen display to be displayed within the web browser, the second screen display showing a first button for activation of the payment coupon, a prompt to select the first button to activate the payment coupon, and a second button to manage accounts associated with the payment coupon;
      responsive to the user selecting the second button on the second screen display within the web browser, provide a third screen display to be displayed within the web browser, the third screen display showing an available accounts field containing identifications of a plurality of deposit accounts associated with the user and a prompt to select one deposit account of the plurality of deposit accounts; and provide a fourth screen display to be displayed within the web browser, the fourth screen display including a first display region and a second display region, the first display region displaying a scanned image of the payment coupon, and the second display region displaying confirmation of how scanned information displayed in the first display region is to be interpreted;

interpreting, by coupon interpretation logic of the data processing computer system, the image data from the payment coupon based on the configuration information provided by the recipient of payments, wherein the payment coupon is partitioned into a plurality of regions, and wherein interpreting the image data from the payment coupon includes successively examining each of the plurality of regions to extract information from that region; and crediting, by account processing logic of the data processing computer system, the check deposit to the selected deposit account in accordance with the interpreted image data.

2. A computer system according to claim 1, wherein the process further includes generating report providing details regarding payments that have been received by the recipient of payments from its customers.

3. A computer system according to claim 2, wherein the report provides details regarding payment amounts and payment dates for payments received from individual customers.

4. The computer system of claim 1, wherein the payment coupon is required to credit the check deposit to the selected deposit account.

5. A computer-implemented data processing system comprising:

a data storage system;

coupon configuration logic, the coupon configuration logic being configured to cooperate with user interface logic to prompt a recipient of a payment comprising a check and a payment coupon to provide user inputs to generate configuration information, the user inputs designating a region of a sample payment coupon and defining how scanned information in the designated region is to be interpreted, and the coupon configuration logic being configured to store the configuration information in the data storage system, wherein the payment coupon is associated with a periodic payment made to the recipient of payments, wherein the image data for the payment coupon includes information related to the periodic payment, and wherein the coupon configuration logic provides a first screen display to be displayed within a web browser, and wherein the configuration information is received by way of the Internet, and wherein the coupon configuration logic is further configured to:

provide a second screen display to be displayed within the web browser, the second screen display showing a first button for activation of the sample payment coupon, a prompt to select the first button to activate the payment coupon, and a second button to manage accounts associated with the sample payment coupon;

responsive to the user selecting the second button on the second screen display within the web browser, provide a third screen display to be displayed within the web browser, the third screen display showing an available accounts field containing identifications of a plurality of deposit accounts associated with the user and a prompt to select one deposit account of the plurality of deposit accounts; and provide a fourth screen display to be displayed within a web browser, the fourth screen display including a first display region and a second display region, the first display region displaying a scanned image of the sample payment coupon, and the second display region displaying confirmation of how scanned information displayed in the first display region is to be interpreted;

payment coupon interpretation logic configured to access the configuration information in the data storage system and to interpret image data for the payment coupon based on the configuration information provided by the recipient of the payment, wherein the payment coupon is partitioned into a plurality of regions, and wherein the payment coupon interpretation logic is configured to interpret the image data from the payment coupon by successively examining each of the plurality of regions to extract information from that region; and account processing logic configured to credit the check to the selected deposit account in accordance with the interpreted image data.

6. A system according to claim 5, wherein the configuration information is stored in the data storage system along with configuration information received from other users associated with other recipients of payments.

7. A system according to claim 5, wherein the configuration information includes information to configure processing of a scanned customer number or a scanned customer name or both.

8. A system according to claim 5, wherein the configuration information includes information to configure processing of a scanned invoice number.

9. A system according to claim 5, wherein the recipient of payments is a business and wherein the payments are payments received from customers of the business in exchange for goods or services or both.

10. A data processing computer system, comprising:

a processor and non-transitory machine-readable media having instructions stored therein that, when executed by the processor, cause the system to implement a process that includes:

scanning, by a check scanner of the data processing computer system, a sample payment coupon;

providing a first screen display to be displayed within a web browser, the first screen display showing the sample payment coupon, a prompt to provide user inputs designating a region of the sample payment coupon and to define how scanned information in the designated region is to be interpreted;

receiving, by the data processing computer system by way of the Internet, the user inputs from a recipient of payments, the user inputs designating the region of the sample payment coupon and defining how scanned information in the designated region is to be interpreted;

providing a second screen display to be displayed within the web browser, the second screen display showing a first button for activation of the sample payment coupon, a prompt to select the first button to activate the payment coupon, and a second button to manage accounts associated with the sample payment coupon;

responsive to the user selecting the second button on the second screen display within the web browser, providing a third screen display to be displayed within the web browser, the third screen display showing an available accounts field containing identifications of a plurality of deposit accounts associated with the user and a prompt to select one deposit account of the plurality of deposit accounts;

providing a fourth screen display to be displayed within the web browser, the fourth screen display including a first display region and a second display region, the first display region displaying a scanned image of the sample payment coupon, and the second display region displaying confirmation of how scanned information displayed in the first display region is to be interpreted;

electronically depositing, by the data processing computer system, a check into the selected deposit account with a bank, including electronically transmitting the check and a payment coupon to the bank, the payment coupon having a common format with the sample payment coupon to permit the configuration information to be used in interpreting the payment coupon, wherein:

the payment coupon is associated with a periodic payment made to the recipient of payments;

the payment coupon includes image data including information related to the periodic payment; and the payment coupon is partitioned into a plurality of regions, and wherein interpreting the image data from the payment coupon includes successively examining each of the plurality of regions to extract information from that region.

11. A data processing computer system for processing a check deposit from a recipient of payments, comprising:

a processor and non-transitory machine-readable media having instructions stored therein that, when executed by the processor, cause the system to implement a process that includes:

receiving, by network interface logic of the data processing computer system from a computing device including a check scanner, image data for a check;

receiving, by the network interface logic of the data processing computer system, image data for a payment coupon associated with the check, wherein the payment coupon is associated with a periodic payment made to the recipient of payments, and wherein the image data for the payment coupon includes information related to the periodic payment;

accessing, by coupon configuration logic of the data processing computer system, stored configuration information indicating a manner in which scan fields in the payment coupon are to be interpreted, the configuration information being received from the recipient of payments, wherein the coupon configuration logic provides a first screen display to be displayed to the recipient of payments within a web browser, and wherein the configuration information is received by way of the Internet, the configuration information comprising definitions of how scanned information in designated regions is to be interpreted, and wherein the coupon configuration logic is further configured to:

provide a second screen display to be displayed within the web browser, the second screen display showing a first button for activation of the payment coupon, a prompt to select the first button to activate the payment coupon, and a second button to manage accounts associated with the payment coupon;

responsive to the user selecting the second button on the second screen display within the web browser, provide a third screen display to be displayed within the web browser, the third screen display showing an available accounts field containing identifications of a plurality of deposit accounts associated with the user and a prompt to select one deposit account of the plurality of deposit accounts; and provide a fourth screen display to be displayed within the web browser, the fourth screen display including a first display region and a second display region, the first display region displaying a scanned image of the payment coupon, and the second display region displaying confirmation of how scanned information displayed in the first display region is to be interpreted;

interpreting, by coupon interpretation logic of the data processing computer system, the image data from the payment coupon based on the configuration information provided by the recipient of payments, wherein the payment coupon is partitioned into a plurality of regions, wherein interpreting the image data from the payment coupon includes successively examining each of the plurality of regions to extract information from that region; and crediting, by account processing logic of the data processing computer system, the check deposit to the selected deposit account in accordance with the interpreted image data.

\* \* \* \* \*